United States Patent [19]
Potesta et al.

[11] Patent Number: 5,351,580
[45] Date of Patent: Oct. 4, 1994

[54] ELECTRICALLY HEATED WIRE STRIPPING DEVICE

[75] Inventors: Richard E. Potesta, Salem; Gary E. Medved, Lyndhurst, both of Ohio

[73] Assignee: Milbar Corporation, Chagrin Falls, Ohio

[21] Appl. No.: 107,513

[22] Filed: Aug. 17, 1983

[51] Int. Cl.$^5$ .............................. H02G 1/12
[52] U.S. Cl. ........................ 81/9.44; 219/233
[58] Field of Search .............. 81/9.4, 9.44; 219/221, 219/227, 229, 233, 236, 237, 238; 30/140

[56] References Cited

U.S. PATENT DOCUMENTS

| | | |
|---|---|---|
| 3,752,017 | 8/1973 | Lloyd et al. |
| 4,932,291 | 7/1990 | Potesta |

FOREIGN PATENT DOCUMENTS

| | | |
|---|---|---|
| 2644935 | 4/1978 | Fed. Rep. of Germany |
| 3331979 | 4/1985 | Fed. Rep. of Germany |
| 0936138 | 6/1982 | U.S.S.R. |
| 945402 | 12/1963 | United Kingdom |
| 1258937 | 12/1971 | United Kingdom |

*Primary Examiner*—Roscoe V. Parker
*Attorney, Agent, or Firm*—Calfee Halter & Griswold

[57] ABSTRACT

An electrically heated thermal wire stripping hand tool device is provided which uses electrically heated ceramic blades or jaws having severing edges to remove insulation from electrical wire. The tool includes a pair of arms hingedly connected which removably mount stripping jaws thereon at their distal ends. Each jaw has an insulation severing edge which when heated will melt or otherwise degrade the insulation on the wire when it coacts with the severing edge on the mating jaw. Electrically heated wires and circuitry are provided which heat the severing edges of the jaw. Contacts are provided which removably secure each jaw to one of the arms to provide electrical power thereto. The jaws and contacts are also provided with alignment devices which coact with each other when the jaws are mounted on the arms to provide alignment in both the x and y axes of the plane on which the jaws mate for severing insulation.

10 Claims, 4 Drawing Sheets

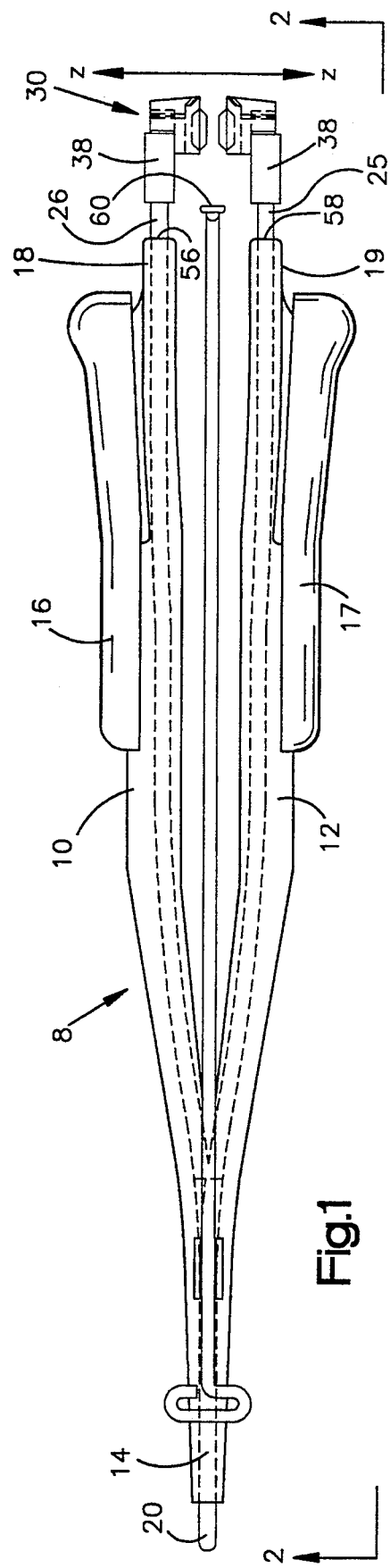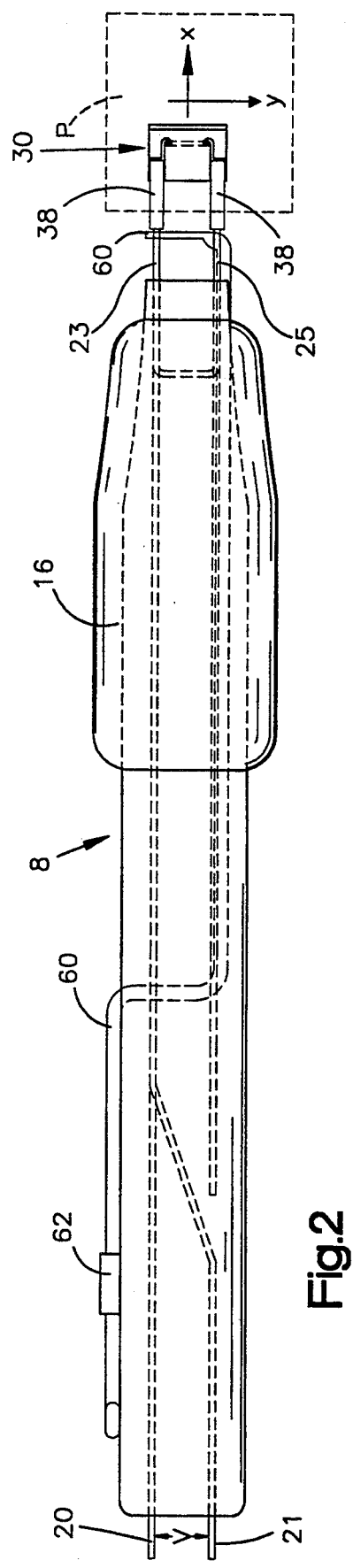
Fig.1
Fig.2

ELECTRICALLY HEATED WIRE STRIPPING DEVICE

FIELD OF THE INVENTION

This invention relates to a hand tool for stripping insulation from sections of insulated electrical wire, and more particularly to a hand operated electrically heated thermal wire stripping tool. In certain particular aspects, this invention relates generally to improved construction and mounting of the jaws of an electrically heated thermal wire stripping device.

BACKGROUND ART

In the removal of insulation from electrical wire, it is often desired, and even sometimes necessary to remove the insulation from wires without nicking, scratching or cutting the wires themselves since electrical and mechanical failures can result from wires that have been weakened or damaged during the insulation stripping process.

One particular device which has been suggested and taught for such a purpose is shown in U.S. Pat. No. 4,059,892 to Sidon. This device uses deformable blades of sufficient hardness to cut through the insulation but not the wire. Significant manual pressure is required to cut through the insulation, especially in the case of wires covered by Teflon ® insulation or other tough insulation which is difficult to cut mechanically. In this case, blades of sufficient hardness to cut through the Teflon ® or other tough insulation can result in nicks and indentations in the wire during the stripping process even though deformable blades are employed.

Other devices employ thermal means to sever the insulation from the wire. Such devices, however, often employ metallic blades which are electrically heated. The metal to metal contact between the blades and the wire which occurs during the stripping process often results in a slight nicking or scratching of the wire. Moreover, certain military specifications specifically require that during the stripping process, no current carrying element shall contact the wire being stripped.

A more recent innovation of electrically heated thermal stripping tools is shown and described in U.S. Pat. No. 4,932,291 entitled "Thermal Wire Stripper" and assigned to the assignee of the present invention. This device is a significant improvement over the prior devices in that it overcomes many of the drawbacks of those earlier devices. However, there are certain characteristics of this device which, in some cases, may result in less than optimum operation and results. For example, the contact of the electrical conductors in the conducting legs which contact the resistance heating wire in the blade is a squeeze type point contact which upon frequent replacement may tend to degrade to some extent. This will diminish the current carrying capacity of the electrical circuit and thus impair the heating of the resistance wire. Moreover, the jaws utilized are not aligned in both the x and y axes of the plane on which the jaws mate. Misalignment of the jaws can result in less than optimal cutting operations in some instances.

SUMMARY OF THE INVENTION

According to the present invention, a hand operated electrically heated thermal wire stripping tool is provided which uses electrically heated ceramic blades or jaws having severing edges to strip insulation from electrical wire. The tool includes a handle member which has a pair of arms which are resiliently interconnected at their proximal ends. The distal ends of the arms are movable toward and away from each other and removably mount stripping jaws or tips thereon formed of a non-conducting ceramic material. Each jaw has an insulation severing edge which when heated will melt or otherwise degrade the insulation on the wire when it engages the insulation on the wire. Electrically heated wires and circuitry are provided which heat the severing edges of the jaw. Contacts are provided which removably secure each jaw to one of the arms to provide electrical power thereto. The jaws are also provided with alignment devices which coact with each other when the jaws are mounted on the arms to provide alignment in both the x and y axes of the plane on which the jaws mate for severing insulation.

DESCRIPTION OF THE DRAWINGS

FIG. 1 is a side elevational view of an electrically heated hand operated thermal wire stripping device according to the present invention;

FIG. 2 is a top plan view of the electrically heated hand operated thermal wire stripping device of FIG. 1;

DESCRIPTION OF THE PREFERRED EMBODIMENT

Figure 3:
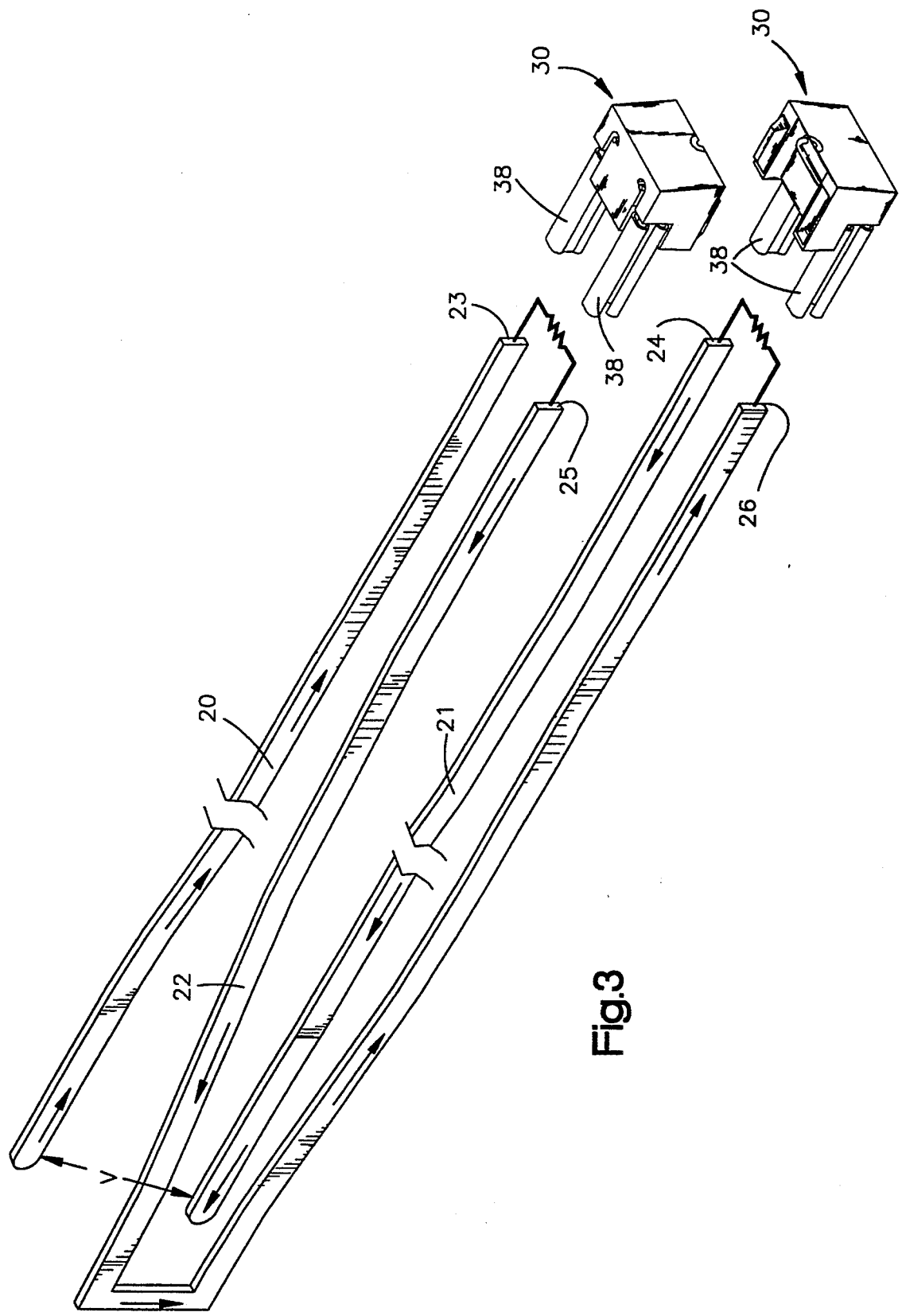
FIG. 3 is a view showing the electrical circuitry of the device and the mounting of the jaws.

Referring now to the drawings, an electrically heated hand operated thermal wire stripping device according to the present invention is shown. As can best be seen in FIGS. 1 and 2, the thermal stripping device of the present invention has a main body 8 which is molded as a unitary device having a pair of laterally operated arms 10, 12 which are joined at their proximal ends to form a hinged configuration 14. The device is formed of a electrically insulating material such as a 20% glass filled polyphenylene sulfide of the type sold under the name Fortron-0214-C1 by Hoechst Celense Corp. of Chatham, N.J. Other materials can be used provided they are heat resistant, dielectric, and provide the proper resiliency for action of the arms. Embedded in the body is an electrical conductor as will be described presently. The arms 10, 12 are each provided with a grip 16 and 17 respectively formed of foamed plastisol material. The natural resiliency of the molded arms 10 and 12 together with the hinge configuration 14 normally biases the arms to an open position as shown in FIG. 1 with the distal ends 18 and 19 being spaced. Because of the resiliency of the arms and the hinged configuration 14, the arms are movable toward and away from each other on a z axis as shown in FIG. 1 which z axis is perpendicular to a plane p extending between the arms and defining the plane where the jaws mate as will be described in more detail presently. Also, because of the natural resiliency of the insulation material which forms the arms and the interconnection in hinged area 14, the arms can be moved with respect to each other at least to a certain extent on the y axis of the plane p which axis shown in FIG. 2. Thus, the natural resiliency of the arms 10, 12 and the resiliency of the hinged area 14 allow for the movement of the arms in the z axis perpendicular to the plane p and in the y axis of the plane p as shown respectively in FIGS. 1 and 2. No similar movement is provided for by the configuration of the arms 10, 12, and the hinged area 14 in the x direction on plane p but this will be provided for as will be described presently.

Figure 4:
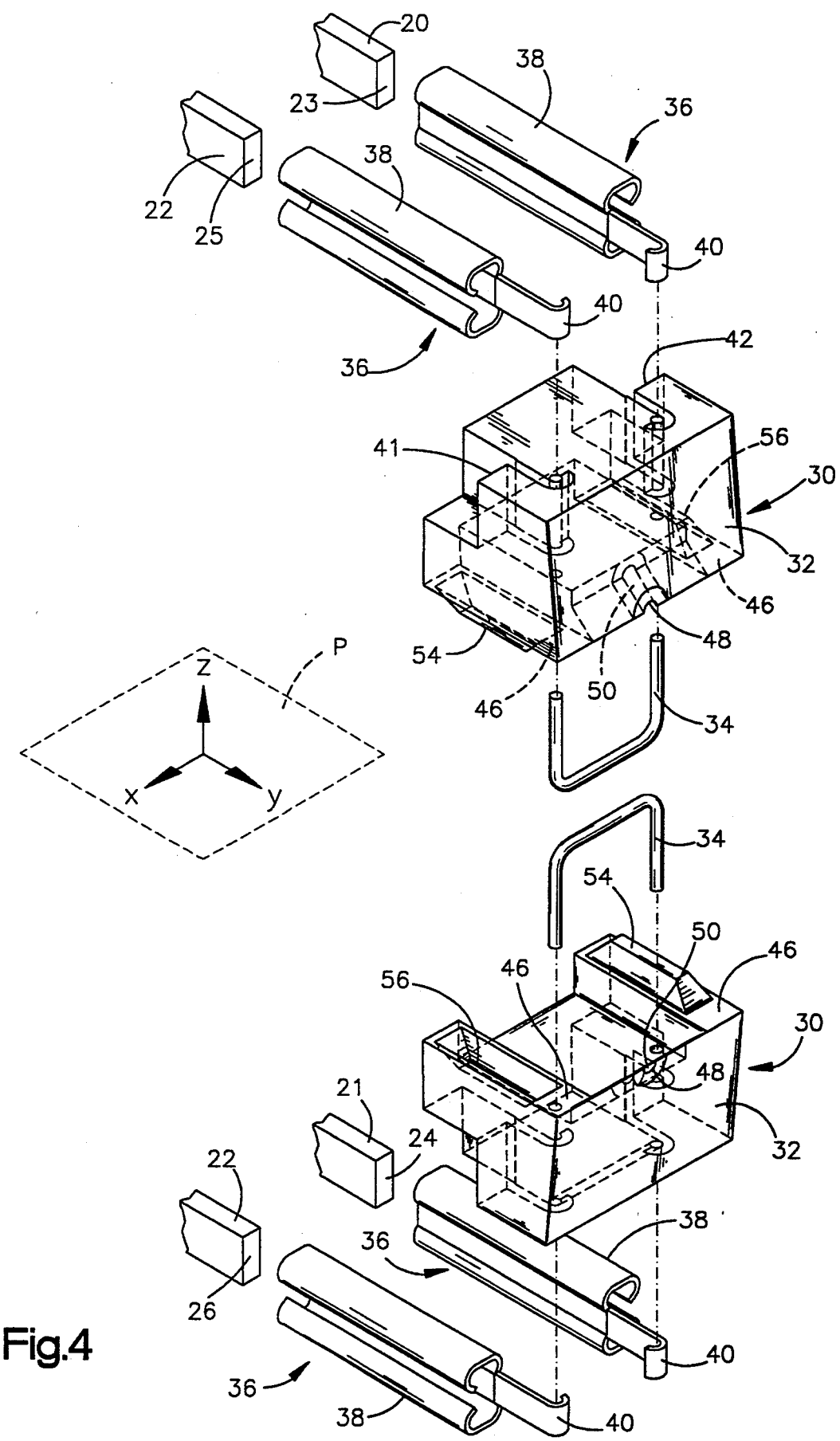
FIG. 4 is an exploded perspective view somewhat in detail showing the construction of the jaws and the mounting thereof onto the arms of the device.

An electrical conductor circuit is molded within the device, the components of which are shown schematically in FIG. 3. These components include a pair of spaced elongate electrical conducting members 20 and 21 and a "U" shaped conducting member 22 all formed of an electrically conducting material such as copper or copper alloy sheets or wire. When the jaws are attached, as will be described presently, with the resistance wires in the circuit as indicated schematically in FIG. 3, the circuit will be completed as shown by the arrows, and will be conducting when a voltage V is applied to conductors 20 and 21. (The arrows merely indicate the circuit and do not indicate current flow). As shown in FIGS. 1, 2, and 4, conducting members 20, 21 and 22 are molded into the arms 10, 11 in such a manner that they have end legs projecting from the ends of the arms 10 and 11 as follows. Conducting member 20 terminates at a leg 23 extending from one side of the distal end 18 of arm 10; conducting member 21 terminates in a leg 24 extending from one side of distal end 19 of the arm 12; and the conducting member 22 terminates in a pair of connector legs 25 and 26, leg 25 extending from the opposite side of distal end 18 of arm 10 and leg 26 extending from the opposite side of the distal end 19 of arm 12. These legs are disposed such that the legs 23 and 25 are adapted to receive one jaw 30 and the legs 24 and 26 are adapted to receive the other jaw 30. The two jaws 30 are connected to the legs 23, 24, 25, and 26 in such a way so as to establish a completed circuit relationship as shown schematically in FIG. 3. Also, the U-shaped configuration of the copper conducting member 22 adds to the resiliency of the arms, since the conducting member is molded into both arms 10 and 12.

Figure 5:
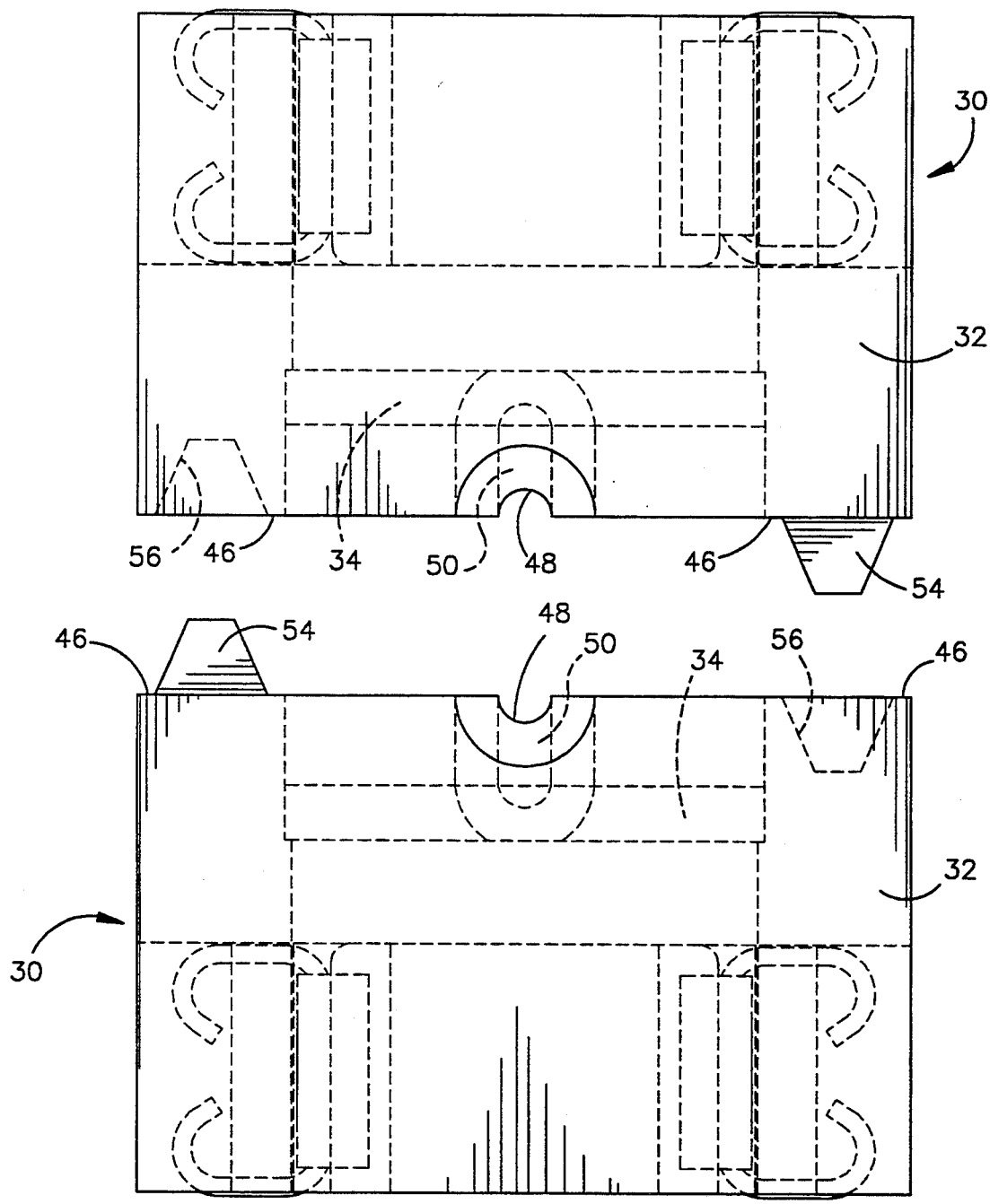
FIG. 5 is a front elevational view on an enlarged scale showing the jaws of the present invention and how they mate.

Referring now to FIGS. 4 and 5, each of the jaws 30 is formed of a molded ceramic material such as aluminum oxide 32 in which is embedded in a resistance heater wire 34. The jaws are each provided with a pair of slide connectors 36 each of which has a generally tubular shaped sleeve portion 38 extending from the ceramic material 32 and a wire engaging portion 40 and engaging opposite ends of the resistance heater wires. The sleeve portions 38 of the jaws are connected to the legs 23, 24, 25 and 26 as shown in FIGS. 1-4 by sliding the sleeve portions 38 over the respective legs in telescoping relationship. The slide connectors are formed of a good electrical conducting material that also has good spring properties such as inconel. The sleeve portions are formed to snugly and resiliently engage the legs 23, 24, 25, and 26 of the conductors. The jaws are positioned on the legs 23, 24, 25 and 26 by pushing the surfaces 41 and 42 of the ceramic portion 32 of the jaws 30 against the ends of the legs 23, 24 for one jaw and legs 25 and 26 of the other jaw to provide solid electrical and mechanical interconnection between the legs 23, 24, 25 and 26 and the slide connectors 36. The legs 23, 24, 25 and 26 are formed to terminate at locations which will closely align the jaws 30 on the x axis of plane p. One of the important benefits of this invention is this telescoping electrical connection which provides good solid mechanical support and elongated area electrical contact to provide excellent electrical conductivity together with allowing for precise alignment on the y axis on the plane p as will be described presently.

Each of the jaws 30 includes a mating face 46 which faces are adapted to come into contact with each other when the arms 10, 12 are operated to close the jaws from the open position shown in FIG. 1. The jaws, if brought into contact, will mate on plane p. The jaws are provided with a severing or cutting edge 48 which is heated by the resistance wire 34 so that during operation it will engage and electrically severe through insulation on wire by melting or otherwise heat degrading the insulation. However, the wire 34 is not exposed at the severing end or at any other surface portion of the ceramic 32. The jaws also each have a wire receiving groove 50 which receives and holds the wire during the stripping operation. Thus, there is no metal to metal contact, the only metal wire contact being with the ceramic material 32 after it has heated and severed through the insulation.

Alignment each of the jaws 30 is provided for by a pyramidal projection 54 on one side thereof extending upwardly from the mating face 46 and a complimentary pyramidal recess 56 on the opposite side. The preferred configuration of the alignment device is the configuration shown in FIGS. 4 and 5 which is in the form of a frustrum of a pyramid; however, other mating devices can be used, the preferred ones being tapered. The projections 54 and recesses 56 are positioned on the jaws such that when the jaws are moved together from the position shown in FIGS. 1 and 5, the projection 54 on one jaw 30 will mate with the recess 56 on the opposite jaw. The natural resiliency of the arms 10, 12 and hinge portion 14 allow the jaw 30 to move on the y axis of plane p when the jaws 30 on the opposite arms 10, 12 engage each other. With respect to the alignment of the jaws 30 on the x axis of the plane p, an appropriate tool can be inserted between the sleeve portions 38 of one of the jaws and associated end wall 56 of arm 10 or end wall 58 of arm 12. Pressure exhibited by the tool against the sleeve will cause the jaw 30 to slide on its respective legs 23 and 25 or 24 and 26 to align the misaligned jaw 30 with the other jaw 30 on the x axis of plane p.

Also, as will be noted, the jaws when formed to this configuration are interchangeable; i.e. a single jaw configuration can be used on either arm 10 or arm 12, the configuration of the pyramids and the grooves being such that a jaw will mate with a similar jaw rotated 180°.

Because of the facile removal and replacement of the jaws 30, various different jaws may be provided with the tool having grooves 50 of various sizes to accommodate different diameter wires. Also, for some operations, the grooves 50 can be eliminated and the severing edge 48 may be formed as a straight knife edge.

In order to provide for a preferred length of stripping of insulation from the end of the wire, a stop member 60 is provided which is slidably mounted on a stop member mount 62 on the handle 10. Sliding of this stop member will allow a wire to be inserted past the jaws to the desired amount and the jaws closed and the stripping accomplished.

OPERATION

To initiate operation of the device, a voltage V is applied across the proximal end of conductor 20 and proximal end of conductor 21 at the location where they extend through the hinge location 14 as shown in FIG. 2. The electrical circuit is thus energized by a current source preferably alternating current causing electrical current to flow through the embedded resistance circuit elements 20, 21, and 22 and their respective resistance heating wires 34 of each of the jaws as shown in FIGS. 3 and 4. The embedded resistance wires 34 heat the severing or cutting edges 48 of the jaws 30 to a sufficient temperature to melt or otherwise heat degrade the insulation or electrical wire. The stop member 60 is adjusted to correspond to the desired length of insulation that is to be removed from the electrical wire. The wire is then inserted axially along a path of the adjustable stop between the jaws 38. The tool is then grasped in one hand of the of the user by the grip members 16 and 18. Pressure is then exerted to move the arms 10 and 12 toward each other which causes the cutting edges 48 on opposite jaws to engage the insulation on the wire. As the insulation melts, the two jaws 30 move toward contact with each other. As the jaws 30 approach each other, the projections 54 and corresponding recesses 56 will engage each other and cause precise alignment of the jaws in the y axis on the plane p as indicated previously. Also slight movement is possible on the x axis, thus providing for accurate jaw alignment. When the severing edges 48 melt completely through the insulation of the wire, the insulation is removed and the configuration of the jaws hold the insulation in place. When the hand pressure is released from the gripping portions 16 and 18, the arms 10, 12 swing apart because of the resiliency of the legs 10, 12 and hinge portion 14; and the stripped portion of the insulation can then be discarded.

The jaws 30 act as an electrical insulator thereby preventing the wire being stripped from causing an electrical short between each of the heating elements 34 in the jaws. Although ceramic materials in general have a slightly higher specific heat than steel, or other heating elements, the low of specific gravity (or density) of ceramics reduces the amount of heat required to bring the severing edges 48 to an operating temperature. Moreover, since these edges come to a fine edge, the heat is concentrated therein allowing the heating wire to be effective. Moreover, melted insulation does not have the tendency to adhere to ceramic as it does to steel, and thus the jaws tend to remain free of any debris and the resulting portion of the wire is clean and well suited for its ultimate electrical connection.

Although one embodiment of this invention has been shown and described, various adaptations and modifications can be made without departing from the scope of the invention as defined in the appended claims.

We claim:

1. A thermal wire stripping device comprising:
    a pressure actuated set of first and second arms laterally opposed and having distal ends, said arms being interconnected at a location remote from their distal ends with said distal ends being movable toward and away from each other on a z axis upon application and release of pressure thereon;
    an electrical conductor circuit carried by said arms and including jaw mounts at the distal ends of each of said arms;
    a pair of jaws comprised of a ceramic material each having a severing edge, and a resistance heater spaced from the severing edge;
    said jaws including electrically conducting members associated therewith in electrical circuit relationship with the resistance heaters and slidably mounting each jaw on the jaw mounts of one of said arms to form a conducting circuit with said electrical conductor circuitry carried by said arms, the contact between the conducting member and jaw mounts being a telescoping mechanical and electrical connection.

2. The invention as described in claim 1 wherein said jaw mounts include elongate conductor end portions, and said electrical conducting members on said jaws includes sleeve portions surrounding said elongate conductor end portions.

3. The invention as defined in claim 2 wherein said jaw mounts include a pair of elongate end portions associated with each arm, and said electrical conducting members on each of said jaws including a pair of sleeve portions.

4. The invention as defined in claim 1 wherein said jaws include coacting devices formed on the jaws to align the jaws in at least one direction in a plane normal to the z axis.

5. The invention as defined in claim 4 wherein said alignment device includes a projection on one jaw and a mating recess on the other jaw.

6. The invention as defined in claim 5 wherein said jaws having mating faces, and wherein said projections and said recesses are on said mating faces.

7. The invention as defined in claim 5 wherein said projection and said recesses are tapered.

8. The invention as defined in claim 7 wherein the projection and recess are generally pyramidal in shaped.

9. The invention as defined in claim 5 wherein each jaw includes a projection and a recess, and wherein said projections and recesses are so configured as to align with each other when said jaws are arranged in an opposing position; whereby a single jaw configured can be used for both jaws.

10. The invention as defined in claim 1 further characterized by said jaws and said jaw mounts including coacting stop members to align the jaws in a direction axial of said telescoping mechanical connectors of said arms.

* * * * *